US012479752B2

(12) United States Patent
Pawale et al.

(10) Patent No.: US 12,479,752 B2
(45) Date of Patent: Nov. 25, 2025

(54) FLEXIBLE SEALING ASSEMBLY FOR OPTICAL FIBER DRAW FURNACE AND OPTICAL FIBER

(71) Applicant: Sterlite Technologies Limited, Haryana (IN)

(72) Inventors: Anant Pawale, Haryana (IN); Milind Patil, Haryana (IN); Anand Pandey, Haryana (IN); Pankaj Priyadarshi, Haryana (IN)

( * ) Notice: Subject to any disclaimer, the term of this patent is extended or adjusted under 35 U.S.C. 154(b) by 257 days.

(21) Appl. No.: 18/176,539

(22) Filed: Mar. 1, 2023

(65) Prior Publication Data

US 2023/0295033 A1    Sep. 21, 2023

(30) Foreign Application Priority Data

Mar. 16, 2022   (IN) .............................. 202211014403

(51) Int. Cl.
    *C03B 37/03*    (2006.01)
    *C03B 37/025*   (2006.01)

(52) U.S. Cl.
    CPC .......... *C03B 37/032* (2013.01); *C03B 37/025* (2013.01); *C03B 2205/80* (2013.01)

(58) Field of Classification Search
    None
    See application file for complete search history.

(56) References Cited

U.S. PATENT DOCUMENTS

2015/0321944 A1* 11/2015 Yamazaki ............. C03B 37/027
                                                            277/312

FOREIGN PATENT DOCUMENTS

CN       113336434 A   *  9/2021
JP       2013010657 A  *  1/2013     ........... C03B 37/029

OTHER PUBLICATIONS

JP-2013010657-A Clarivate Analytics machine translation retrieved Mar. 13, 2025. (Year: 2025).*
CN-113336434-A Clarivate Analytics Machine Translation retrieved Mar. 13, 2025. (Year: 2025).*

* cited by examiner

*Primary Examiner* — Lisa L Herring
(74) *Attorney, Agent, or Firm* — Steven R. Fairchild

(57) ABSTRACT

A flexible sealing assembly (100) for an optical fiber draw furnace (500) comprising a first plurality of curved ring sections (110) arranged in a circular arrangement and a plurality of tension loaders (114) exerting continuous radially inward force on at least one curved ring section. Each curved ring section of the first plurality of curved ring sections (110) is separated from each other and defined by the same radius of curvature. Further, the first plurality of curved ring sections (110) is radially movable such that the first plurality of curved ring sections (110) creates a seal between a glass preform (504) and a vertical hollow body (506) in the optical fiber draw furnace (500). The diameter of the glass preform (504) varies.

7 Claims, 7 Drawing Sheets

FLEXIBLE SEALING ASSEMBLY FOR OPTICAL FIBER DRAW FURNACE AND OPTICAL FIBER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Application No. 202211014403 titled "FLEXIBLE SEALING ASSEMBLY FOR OPTICAL FIBER DRAW FURNACE AND OPTICAL FIBER" filed by the applicant on Mar. 16, 2022, which is incorporated herein by reference in its entirety.

FIELD OF THE INVENTION

The present invention relate to the field of optical fiber draw furnace and more particularly, relates to a flexible sealing assembly for an optical fiber draw furnace and a method of manufacturing thereof.

BACKGROUND OF THE INVENTION

Modern optical devices and optical communications systems widely use fiber optic cables. Optical fibers are strands of glass fiber processed so that light beams transmitted through the glass fiber are subject to total internal reflection wherein a large fraction of the incident intensity of light directed into the fiber is received at the other end of the fiber.

Within the field of optical fiber manufacturing, many techniques have been used to produce optical fiber having improved qualities such as reduced optical loss and reduced polarization mode dispersion (PMD). Deposition techniques inside a substrate tube include MCVD (Modified Chemical Vapor Deposition), FCVD (Furnace Chemical Vapor Deposition) or PCVD (Plasma Chemical Vapor Deposition).

Many forms of optical fiber loss are attributable to geometrical deformities present in optical fiber, which often result from conventional optical fiber manufacturing processes. In general, optical fibers typically are manufactured in a draw tower by vertically suspending an optical fiber preform and moving it into a draw furnace at a controlled rate. The preform softens in the furnace and optical fiber is drawn from the softened end of the preform rod by a capstan or other appropriate device located at the base of the fiber draw tower.

The primary preform may consist of a rod fabricated by outside deposition techniques, such as OVD (Outside Vapor Deposition) or VAD (Vapour Axial Deposition). A glass preform produced by an Outside Vapor Deposition (OVD) process has a diameter variation along its length, meaning higher the diameter of the glass preform, more is the diameter variation. To draw such glass preform having the diameter variation, there is a high probability of disturbance of sealing apparatus, due to which oxygen may enter inside an optical fiber draw furnace (i.e., furnace) that can deteriorate furnace health and affect mechanical and optical parameters of an optical fiber produced from that glass preform.

One way to address the aforesaid drawback is using felt rings in accordance with a minimum diameter of the glass preform.

However, the existing felt rings have limitations of flexibility and less elasticity which is not sufficient to tackle high diameter variation of glass preforms greater than 5 mm. Therefore, there exists a need to develop a sealing assembly which solves the aforesaid drawbacks.

SUMMARY OF THE INVENTION

Embodiments of the present invention provide an optical fiber draw furnace (500), comprising a vertical hollow body (506) having a top end (508) and a bottom end (510), a glass preform (504) is hung near the top end (508) and the glass preform (504) is melted to form an optical fiber (502), wherein the optical fiber (502) exits the vertical hollow body (506) from the bottom end (510); and a flexible sealing assembly (100) placed near the top end (508). The flexible sealing assembly (100) further includes a first plurality of curved ring sections (110) arranged in a circular arrangement and a plurality of tension loaders (114) exerting continuous radially inward force on at least one curved ring section. Each curved ring section of the first plurality of curved ring sections (110) is separated from each other. Particularly, the first plurality of curved ring sections (110) is radially movable such that the first plurality of curved ring sections (110) creates a seal between the glass preform (504) and the vertical hollow body (506) while axial movement of the glass preform (504). Moreover, diameter of the glass preform (504) varies.

In accordance with an embodiment of the present invention, the plurality of flexible dielectric ring sections (120) are attached to the first plurality of curved ring sections (110) such that the plurality of flexible dielectric ring sections (120) presses against the glass preform (504) for sealing. In particular, the first plurality of curved ring sections (110) is arranged such that a central passage (122) is formed to enable entry of the glass preform (504). Moreover, each curved ring section is placed such that a first gap (124) exists between adjacent curved ring sections.

In accordance with an embodiment of the present invention, the second plurality of curved ring sections (112) coaxial to the first plurality of curved ring sections (110). The second plurality of curved ring sections (112) is an offset between a first gap (124) between each curved ring section of the first plurality of curved ring sections (110) and a second gap (126) between each curved ring section of the second plurality of curved ring sections (112). Particularly, the offset is between 30 to 70 degrees.

Another embodiment of present invention relates to a method of manufacturing an optical fiber (502) comprising steps of holding a glass preform (504) near a top end (508) of an optical fiber draw furnace (500), melting the glass preform (504) of a diameter greater than 80 mm to form the optical fiber (502) having a diameter less than 260 microns; and feeding the glass preform (504) into the optical fiber draw furnace (500).

The step of feed further comprises periodically or continuously pushing the glass preform (504) into the optical fiber draw furnace (500) as lower end of the glass preform (504) is melted into the optical fiber (502), exerting continuous radially inward force by a first plurality of curved ring sections (110), creating a seal between the glass preform (504) and a vertical hollow body (506). The first plurality of curved ring sections (110) is radially movable and each curved ring section is defined by the same radius of curvature In accordance with an embodiment of the present invention, the method further comprises cooling the optical fiber (502) and/or applying one or more coatings on the optical fiber (502).

The foregoing objectives of the present invention are attained by employing an optical fiber draw furnace

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Figure 1:
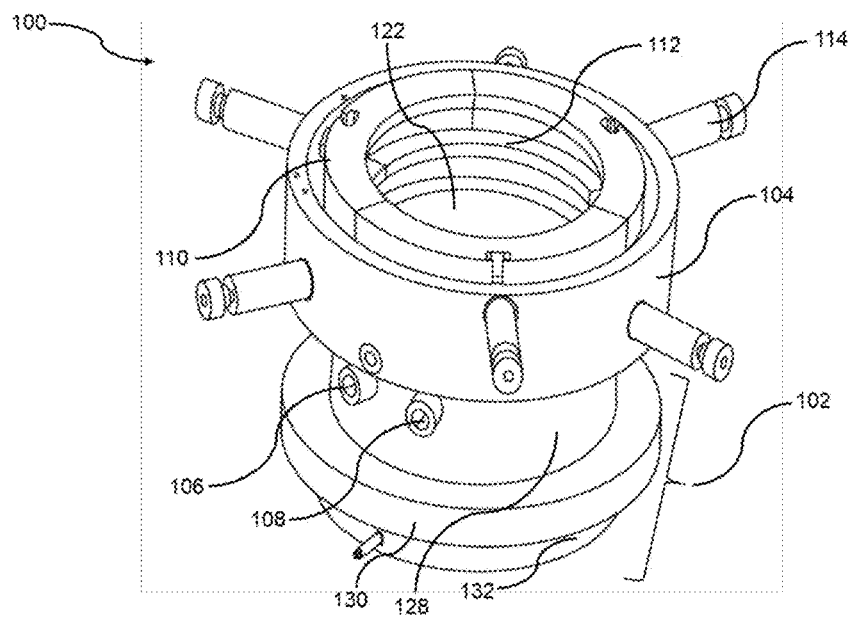
FIG. 1 is a snapshot illustrating a perspective view of a flexible sealing assembly for an optical fiber draw furnace in accordance with an embodiment of the present invention.

Optical fiber draw furnace —500
optical fiber—502
glass preform—504
Vertical hollow body—506
Top end—508
Bottom end—510
Flexible sealing assembly 100
Cooling section 102
Felt holding section 104
Inlet 106
Outlet 108
First plurality of curved ring sections 110
Second plurality of curved ring sections 110
Plurality of tension loaders 114
Plurality of apertures 116
Seal cover 118
Plurality of flexible dielectric ring sections 120
Central passage 122
Top cylindrical element 128
Middle cylindrical element 130
Bottom cylindrical element 132

The example optical fiber draw furnace as illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

The principles of the present invention and their advantages are best understood by referring to FIG. 1 to FIG. 7. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The Following Brief Definition of Terms Shall Apply Throughout the Present Disclosure:

Optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or a multi-core or other suitable category. The optical fiber may be a bend insensitive fiber that has less degradation in optical properties or less increment in optical attenuation during multiple winding/unwinding operations of an optical fiber cable.

ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

Figure 2:
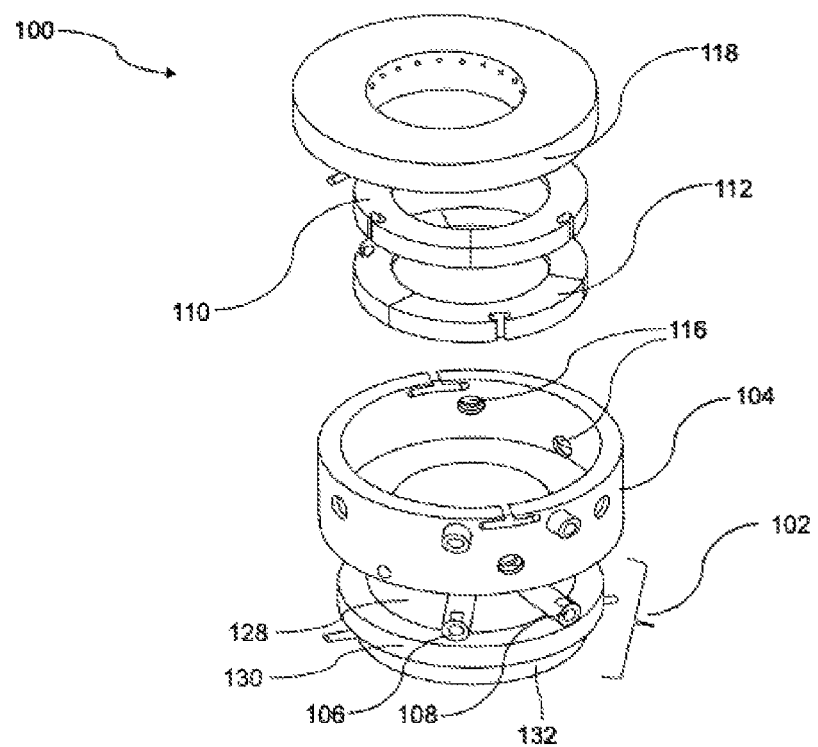
FIG. 2 is a snapshot illustrating an exploded view of the flexible sealing assembly for the optical fiber draw furnace in accordance with an embodiment of the present invention.
Figure 3:
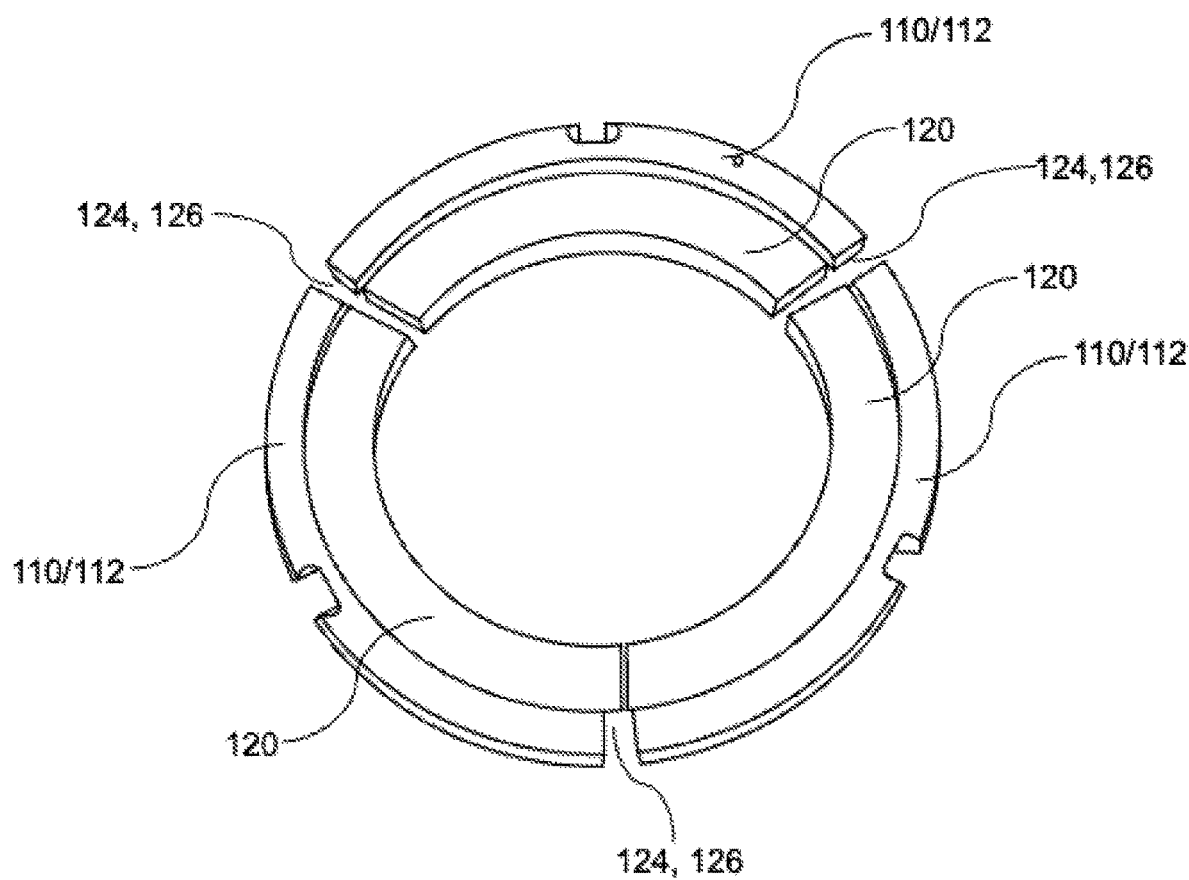
FIG. 3 is a snapshot illustrating curved ring sections and flexible dielectric ring sections for the flexible sealing assembly in accordance with an embodiment of the present invention.
Figure 4:
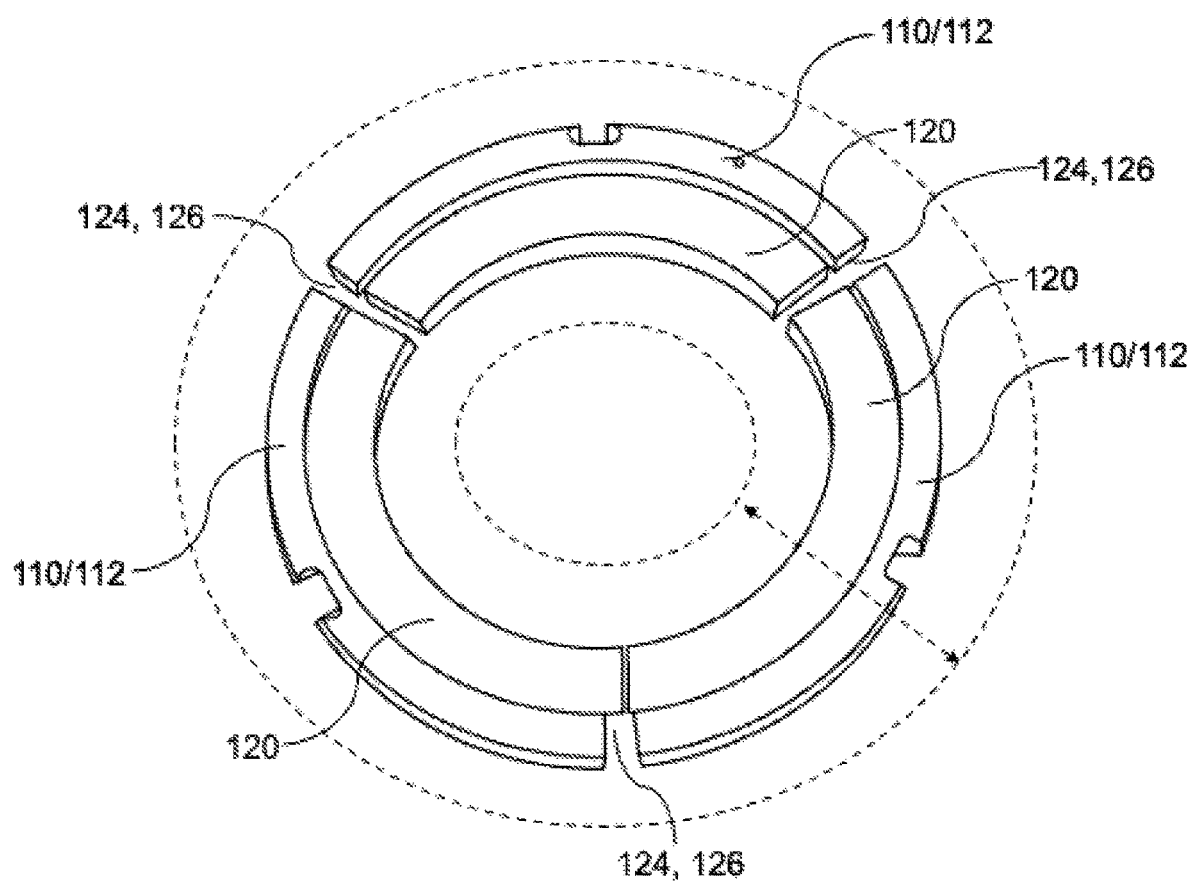
FIG. 4 is a snapshot illustrating movement of the curved ring sections and the flexible dielectric ring sections in the flexible sealing assembly in accordance with embodiment of the present invention.
Figure 5:
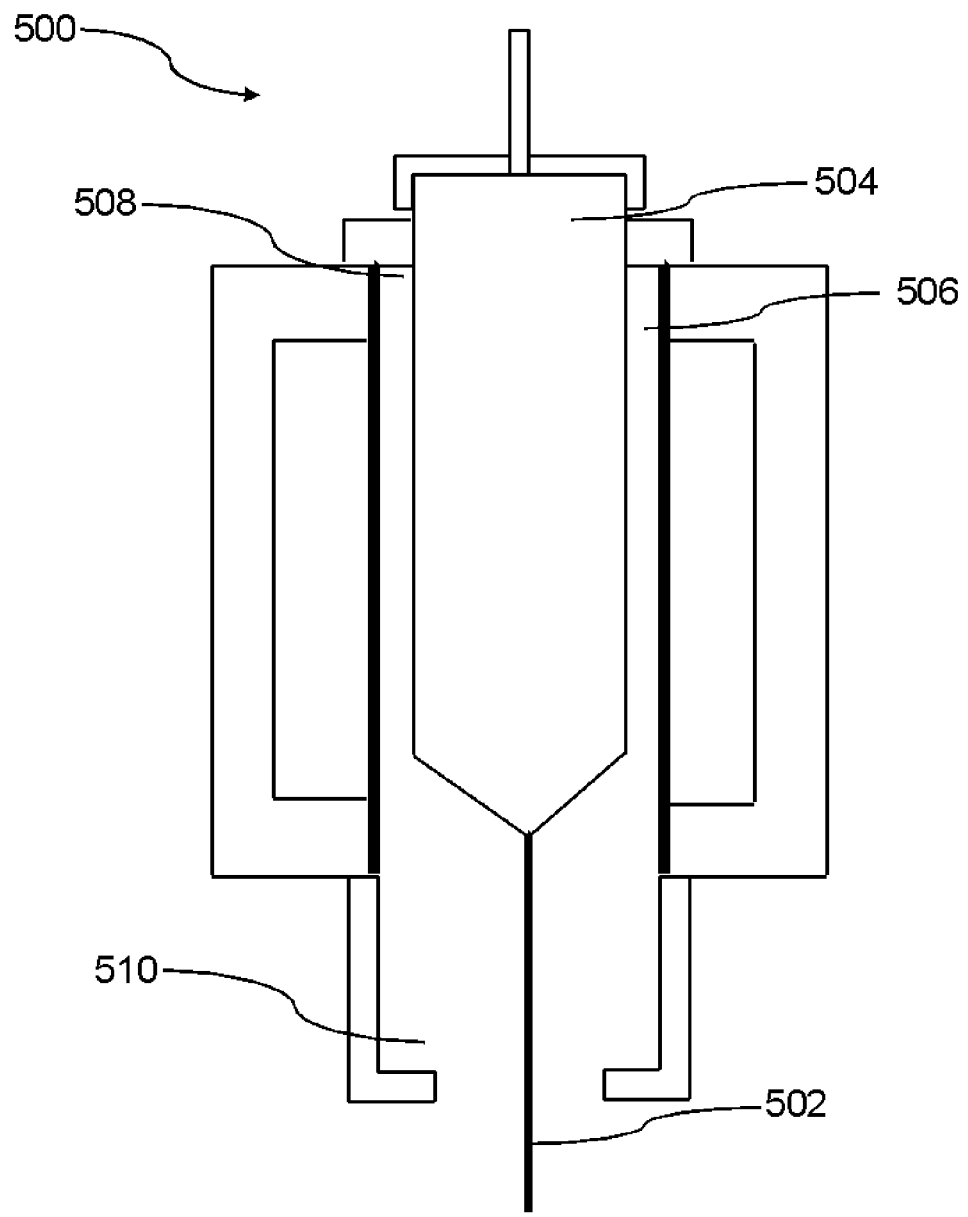
FIG. 5 is a snapshot illustrating an example optical fiber draw furnace in accordance with an embodiment of the present invention.

Now simultaneous reference is made to FIG. 1 illustrating a perspective view of a flexible sealing assembly for an optical fiber draw furnace, FIG. 2 illustrating an exploded view of the flexible sealing assembly for the optical fiber draw furnace, FIG. 3 illustrating curved ring sections and flexible dielectric ring sections for the flexible sealing assembly, FIG. 4 illustrating movement of the curved ring sections and the flexible dielectric ring sections in the flexible sealing assembly and FIG. 5 illustrating an example optical fiber draw furnace.

The furnace sealing assembly 100 and its components may be composed of graphite, aluminum, steel or other suitable material or combination of materials. In particular, the furnace sealing assembly 100 comprises a cooling section 102, a felt holding section 104, an inlet 106, an outlet 108, a first plurality of curved ring sections 110, a second plurality of curved ring sections 112, a plurality of tension loaders 114, a plurality of apertures 116, a seal cover 118 and a plurality of flexible dielectric ring sections 120.

The cooling section 102 may have a three-cylinder structure having a top cylindrical element 128, a middle cylindrical element 130 and a bottom cylindrical element 132. In particular, the top cylindrical element 128, the middle cylindrical element 130 and the bottom cylindrical element 132 are stacked and joined to form the cooling section 102. Moreover, the cooling section 102 may comprise the inlet 106 and the outlet 108, on the top cylindrical element 128, configured for water which help in preventing heat transfer to the plurality of flexible dielectric ring sections 120. Further, the top cylindrical element 128 may have an inner diameter of about 115±0.5 mm and a height of about 64±0.5 mm. Similarly, the middle cylindrical element 130 may have an inner diameter of about 115±0.5 mm, an outer diameter of 190±0.5 mm and a height of about 23±0.5 mm. The bottom cylindrical element 132 may have similar dimensions as the top cylindrical element 128. However, the present disclosure is not limited to these dimensions.

In an embodiment of the present invention, the cooling section 102 may be configured for cooling a glass preform 504.

The felt holding section 104 may be placed at a top portion of the cooling section 102. In particular, the felt holding section 104 may be configured to hold the plurality of flexible dielectric ring sections 120 which is further attached to the first plurality of curved ring sections 110 and the second plurality of curved ring sections 112. Moreover, the plurality of flexible dielectric ring sections 120 is attached to the first plurality of curved ring sections 110 and the second plurality of curved ring sections 112 such that the plurality of flexible dielectric ring sections 120 presses against the glass preform 504 for sealing. Further, the felt holding section 104 may have an inner diameter of about 190±0.5 mm, an outer diameter of about 222±0.5 mm and a height of about 78±0.5 mm.

The felt holding section 104 comprises the first plurality of curved ring sections 110 and the second plurality of curved ring sections 112 which is covered using the seal cover 118. Particularly, the seal cover 118 may have an inner diameter of 115±0.5 mm, an outer diameter of 222±0.5 mm and a height of about 30±0.5 mm. Moreover, the first plurality of curved ring sections 110 is arranged in a circular arrangement. Further, the first plurality of curved ring sections 110 is arranged such that a central passage 122 is formed to enable entry of the glass preform 504.

Each curved ring section 110 is defined by same radius of curvature and is placed such that a first gap 124 exists between adjacent curved ring sections (as shown in FIG. 3). Similarly, the second plurality of curved ring sections 112 is arranged in a circular arrangement. The second plurality of curved ring sections 112 is arranged such that the central passage 122 is formed to enable entry of the glass preform 504. Each curved ring section 112 is defined by same radius of curvature and is placed such that a second gap 126 exists between adjacent curved ring sections. The second plurality of curved ring sections 112 is placed coaxially to the first plurality of curved ring sections 110 (as shown in FIG. 1 and FIG. 2). Further, the second plurality of curved ring sections 112 is placed such that there is an offset between the first gap 124 between each curved ring section of the first plurality of curved ring sections 110 and the second gap 126 between each curved ring section of the second plurality of curved ring sections 112.

In accordance with an embodiment of the present invention, the first plurality of curved ring sections 110 and the second plurality of curved ring sections 112 form a circular seal unit which are placed co-axially such that separating slits of the first plurality of curved ring sections 110 is placed at 30 to 70 degree offset with respect to separating slits of the second plurality of curved ring sections 112.

In accordance with an embodiment of the present invention, each of the first plurality of curved ring sections 110 and the second plurality of curved ring sections 112 may have an inner diameter of about 140±0.5 mm, an outer diameter of about 170±0.5 mm and a height of about 25±0.5 mm.

In accordance with another embodiment of the present invention, each of the first plurality of curved ring sections 110 and the second plurality of curved ring sections 112 is a three-part curved ring section, which when placed offset to each other as mentioned above, provides flexibility in movement to the furnace sealing assembly 100 depending on the diameter variations. The offset arrangement provides flexibility in movement of the first plurality of curved ring sections 110, the second plurality of curved ring sections 112 and the plurality of flexible dielectric ring sections 120 as per the diameter variations (or preform diameter variations) at various location present along a preform length. Such movement is shown in FIG. 4 using dashed circles and line, where each curved ring section of the first plurality of curved ring sections 110 and the second plurality of curved ring sections 112 moves between the two dashed circles (i.e., inner dashed circle and outer dashed circle).

Due to absence of the offset, the diameter variations in adjacent portions of the glass preform 504 might go uncorrected. Each curved ring section of the first plurality of curved ring sections 110 and the second plurality of curved ring sections 112 gets adjusted by spring tension mechanism depending upon preform size variations.

For example, considering large size and triple joint preforms which have diameter variations at small interval lengths, each curved ring section of the first plurality of curved ring sections 110 and the second plurality of curved ring sections 112 helps to detect the diameter variations at small intervals.

The plurality of tension loaders 114 is secured in the plurality of apertures 116 present on the felt holding section 104 using a plurality of connecting means, such as but not limited to nut-spring, to apply spring tension mechanism. Of course, other connecting means are known, foreseeable, and unforeseeable, and each of these is readily apparent to those of skill in the art upon reading the present disclosure. In particular, the plurality of tension loaders 114 is configured to exert continuous radially inward force on at least one curved ring section. Due to such force, the first plurality of curved ring sections 110 and the second plurality of curved ring sections 112, in which each curved ring is separated from each other, is radially movable such that the first plurality of curved ring sections 110 and the second plurality of curved ring sections 112 create a seal between the glass preform 504 and a vertical hollow body 506 (as shown in FIG. 5) in the optical fiber draw furnace 500 (as shown in FIG. 5) while axial movement of the glass preform 504, where diameter of the glass preform 504 may vary.

The vertical hollow body 506 is a cylindrical hollow body that has a top end 508 and a bottom end 510, wherein the glass preform 504 is hung near the top end 508 and then is melted to form an optical fiber 502. The optical fiber 502 exits the vertical hollow body 506 from the bottom end 510. The flexible sealing assembly 100 is placed near the top end 508.

The flexible sealing assembly 100 enables drawing of preforms having up to 18±10 mm diameter variations due to flexibility in the movement of the plurality of flexible dielectric ring sections 120 attached to the first plurality of curved ring sections 110 and the second plurality of curved ring sections 112. The flexible sealing assembly 100 allows drawing of triple joint preforms without affecting furnace health due to separation of the flexible sealing assembly 100 from heat zone and thus an optical fiber with better mechanical and optical parameters can be produced. Unlike conventional complicated compressor assemblies, the flexible sealing assembly 100 incorporates easy to use spring tension mechanism, which provides required flexibility in the movement of the plurality of flexible dielectric ring sections 120 as per preform diameter variations.

Figure 6:
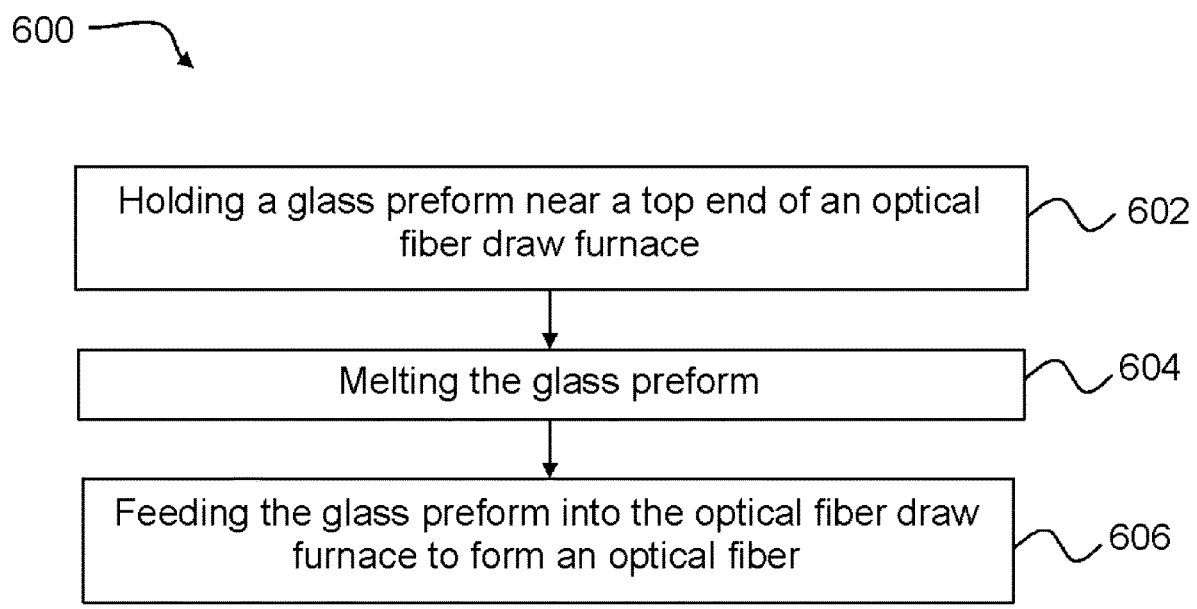
FIG. 6 is a flowchart illustrating a method of manufacturing an optical fiber in accordance with an embodiment of the present invention.

FIG. 6 is a flowchart illustrating a method of manufacturing an optical fiber in accordance with an embodiment of the present invention.

At step 602, the glass preform (aka "cylindrical glass preform") 504 is held near the top end 508 of the optical fiber draw furnace 500.

At step 604, the glass preform 504 is melted. Particularly, the glass preform 504 may have a diameter greater than 80 mm to form the optical fiber 502 having a diameter less than 260 microns.

At step 606, the glass preform 504 is fed into the optical fiber draw furnace 500. During the feeding step, the glass preform 504 is periodically or continuously pushed into the optical fiber draw furnace 500 as lower end of the glass preform 504 is melted into the optical fiber 502 and a continuous radially inward force is exerted by the first plurality of curved ring sections 110 and the second plurality of curved ring sections 112 that create a seal between the glass preform 504 and the vertical hollow body 506. Particularly, the first plurality of curved ring sections 110 and the second plurality of curved ring sections 112 are radially movable and each curved ring section is defined by same radius of curvature.

Figure 7:
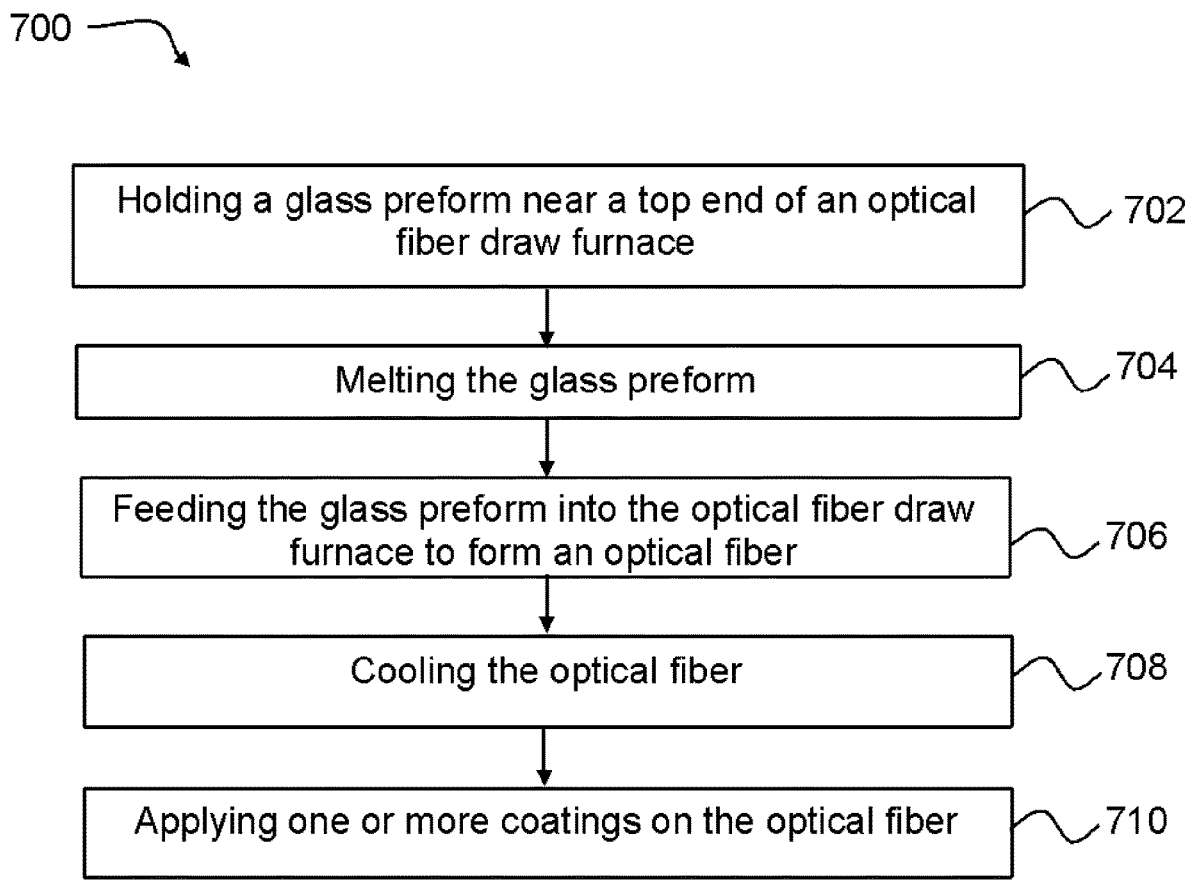
FIG. 7 is a flowchart illustrating a method of manufacturing the optical fiber in accordance with another embodiment of the present invention.

FIG. 7 is a flowchart illustrating a method of manufacturing the optical fiber in accordance with another embodiment of the present invention.

At step 702, the glass preform (aka "cylindrical glass preform") 504 is held near the top end 508 of the optical fiber draw furnace 500.

At step 704, the glass preform 504 is melted. Particularly, the glass preform 504 may have a diameter greater than 80 mm to form the optical fiber 502 having a diameter less than 260 microns.

At step 706, the glass preform 504 is fed into the optical fiber draw furnace 500. During the feeding step, the glass preform 504 is periodically or continuously pushed into the optical fiber draw furnace 500 as lower end of the glass preform 504 is melted into the optical fiber 502 and a continuous radially inward force is exerted by the first plurality of curved ring sections 110 and the second plurality of curved ring sections 112 that create a seal between the glass preform 504 and the vertical hollow body 506. The first plurality of curved ring sections 110 and the second plurality of curved ring sections 112 are radially movable and each curved ring section is defined by same radius of curvature.

At step 708, the optical fiber 502 is cooled. At step 710, one or more coatings are applied on the optical fiber 502.

It may be noted that the flow-chart 600 and 700 are explained to have above stated process steps; however, those skilled in the art would appreciate that the flow-chart 600 and 700 may have more/less number of process steps which may enable all the above stated implementations of the present disclosure.

Advantageously, the flexible sealing assembly for an optical fiber draw furnace provides a sealing assembly that can keep adjusting as per a preform diameter. The multiple curved ring sections help to eliminate diameter variations placed at smaller intervals along a preform length. The three-part curved ring section provides flexibility in movement to the furnace sealing assembly 100 depending on the diameter variations. The arrangement of the flexible sealing assembly 100 prevents unwanted dissipation of heat from the optical fiber draw furnace 500 which further prevents furnace health deterioration and oxidization of the plurality of flexible dielectric ring sections 120, thereby preventing preform deformities like optical fiber with uneven geometric properties.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

We claim:

1. An optical fiber draw furnace (500), comprising:
   a vertical hollow body (506) having a top end (508) and a bottom end (510), wherein a glass preform (504) is hung near the top end (508), wherein the glass preform (504) is melted to form an optical fiber (502), wherein the optical fiber (502) exits the vertical hollow body (506) from the bottom end (510); and
   a flexible sealing assembly (100) placed near the top end (508), the flexible sealing assembly (100) comprising:
   a first plurality of curved ring sections (110) arranged in a circular arrangement, wherein each curved ring section is defined by a same radius of curvature;
   a plurality of flexible dielectric ring sections (120) attached to the first plurality of curved ring sections (110) such that the plurality of flexible dielectric ring sections (120) presses against the glass preform (504) for sealing; and
   a plurality of tension loaders (114) exerting continuous radially inward force on at least one curved ring section, wherein each curved ring section of the first plurality of curved ring sections (110) is separated from each other,
   wherein the first plurality of curved ring sections (110) is radially movable such that the first plurality of curved ring sections (110) creates a seal between the glass preform (504) and the vertical hollow body (506) while axial movement of the glass preform (504), where diameter of the glass preform (504) varies.

2. The optical fiber draw furnace (500) as claimed in claim 1, wherein the first plurality of curved ring sections (110) is arranged such that a central passage (122) is formed to enable entry of the glass preform (504).

3. The optical fiber draw furnace (500) as claimed in claim 1, wherein each curved ring section is placed such that a first gap (124) exists between adjacent curved ring sections.

4. The optical fiber draw furnace (500) as claimed in claim 1, further comprising a second plurality of curved ring sections (112) coaxial to the first plurality of curved ring sections (110).

5. The optical fiber draw furnace (500) as claimed in claim 4, further comprising a second gap (126) between each curved ring section of the second plurality of curved ring sections (112).

6. The optical fiber draw furnace (500) as claimed in claim 5, wherein the second gap between each curved ring section of the second plurality of curved ring sections (112) is offset between a first gap (124) between each curved ring section of the first plurality of curved ring sections (100).

7. The optical fiber draw furnace (500) as claimed in claim 6, wherein the offset is between 30 to 70 degrees.

* * * * *